US012328281B2

(12) United States Patent
Cao et al.

(10) Patent No.: US 12,328,281 B2
(45) Date of Patent: Jun. 10, 2025

(54) UE-TO-UE POSITIONING

(71) Applicant: QUALCOMM Incorporated, San Diego, CA (US)

(72) Inventors: Yiqing Cao, Beijing (CN); Jing Lei, San Diego, CA (US); Wanshi Chen, San Diego, CA (US); Alexandros Manolakos, Escondido, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 18/000,727

(22) PCT Filed: Jul. 31, 2020

(86) PCT No.: PCT/CN2020/106187
§ 371 (c)(1),
(2) Date: Dec. 5, 2022

(87) PCT Pub. No.: WO2022/021320
PCT Pub. Date: Feb. 3, 2022

(65) Prior Publication Data
US 2023/0224123 A1 Jul. 13, 2023

(51) Int. Cl.
*H04L 12/26* (2006.01)
*G01S 5/00* (2006.01)
*H04L 5/00* (2006.01)
*H04L 5/16* (2006.01)

(52) U.S. Cl.
CPC .......... *H04L 5/0051* (2013.01); *G01S 5/0072* (2013.01); *H04L 5/16* (2013.01)

(58) Field of Classification Search
None
See application file for complete search history.

(56) References Cited

U.S. PATENT DOCUMENTS 10,368,200 B2   7/2019  Ryu et al.
11,190,329 B2*  11/2021 Sengupta .............. H04W 72/23
2020/0178036 A1 6/2020  Edge

FOREIGN PATENT DOCUMENTS

CN    107113569 A    8/2017
CN    109842934 A    6/2019
(Continued)

OTHER PUBLICATIONS

Qualcomm Incorporated: "Dl Reference Signals for NR Positioning", 3GPP TSG RAN WG1 #98, R1-1911132, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 18, 2019, Oct. 5, 2019, XP051808855, XP051789908, 20 Pages, paragraph [0001]-paragraph [0009].

(Continued)

*Primary Examiner* — Zewdu A Beyen
(74) *Attorney, Agent, or Firm* — Thien T. Nguyen

(57) ABSTRACT

A first UE includes: a transceiver; a memory; and a processor, communicatively coupled to the transceiver and the memory, configured to: at least one of: initiate a first UE-to-UE positioning function in response to receiving a first UE-to-UE positioning trigger from a second UE via the transceiver; or send a second UE-to-UE positioning trigger for the second UE via the transceiver to cause the second UE to initiate a second UE-to-UE positioning function; or communicate with the second UE via the transceiver to determine a characteristic of a UE-to-UE location reference signal to be exchanged between the first UE and the second UE; and exchange the UE-to-UE location reference signal with the second UE via the transceiver.

50 Claims, 7 Drawing Sheets

(56) References Cited

FOREIGN PATENT DOCUMENTS

| | | | |
|---|---|---|---|
| CN | 110383862 | A | 10/2019 |
| CN | 110958685 | A | 4/2020 |
| CN | 111093154 | A | 5/2020 |
| CN | 111343579 | A | 6/2020 |
| WO | 2020064120 | A1 | 4/2020 |
| WO | 2021240479 | A1 | 12/2021 |
| WO | 2022010910 | A1 | 1/2022 |

OTHER PUBLICATIONS

Qualcomm Incorporated: "Stage 2 for Multi-RTT Positioning", 3GPP TSG-RAN WG2 Meeting #108, R2-1915558, 3rd Generation Partnership Project (3GPP), Mobile Competence Centre, 650, Route Des Lucioles, F-06921, Sophia-Antipolis Cedex, France, vol. RAN WG2, No. Reno, Nevada, USA, Nov. 18, 2019-Nov. 22, 2019, Nov. 8, 2019 (Nov. 8, 2019), XP051817272, 19 Pages, pp. 1-11, p. 2, paragraph 1 and 2, p. 12, paragraph 3.1, paragraph [8. x.2. 2], figures 8.x.3.1.3.1-1, Section 2, Para [002], Table 2.
Supplementary European Search Report—EP20947516—Search Authority—The Hague—Apr. 23, 2024.
International Search Report and Written Opinion—PCT/CN2020/106187—ISA/EPO—May 5, 2021.
LG Electronics: et al., "New SID: Study on Use Cases, Scenarios, and Requirements of Sidelink Positioning", 3GPP TSG RAN Meeting #88e, RP-201272, Jul. 1, 2020 (Jul. 1, 2020), 4 Pages, see description, p. 26, line 25 to p. 34, line 6, figures 13 to 20.

\* cited by examiner

US 12,328,281 B2

UE-TO-UE POSITIONING

CROSS-REFERENCE TO RELATED APPLICATION

This application is the National Stage of International Application No. PCT/CN2020/106187, filed Jul. 31, 2020, entitled "UE-TO-UE POSITIONING," which is assigned to the assignee hereof, and the entire contents of which is hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

SUMMARY

An example first user equipment (UE) includes: a transceiver; a memory; and a processor, communicatively coupled to the transceiver and the memory, configured to: at least one of: initiate a first UE-to-UE positioning function in response to receiving a first UE-to-UE positioning trigger from a second UE via the transceiver; or send a second UE-to-UE positioning trigger for the second UE via the transceiver to cause the second UE to initiate a second UE-to-UE positioning function; or communicate with the second UE via the transceiver to determine a characteristic of a UE-to-UE location reference signal to he exchanged between the first UE and the second UE; and exchange the UE-to-UE location reference signal with the second UE via the transceiver.

Implementations of such a UE may include one or more of the following features. The processor is configured to communicate with the second UE to determine the characteristic of the UE-to-UE location reference signal such that the characteristic of the UE-to-UE location reference signal includes a timing parameter of the UE-to-UE location reference signal to accommodate half-duplex communication by at least one of the first UE or the second UE. The processor is configured to communicate with the second UE to determine the characteristic of the UE-to-UE location reference signal such that the UE-to-UE location reference signal occupies the same one or more symbols in each of a plurality of consecutive slots. The timing parameter includes a muting pattern for the UE-to-UE location reference signal. The timing parameter is at least one quantity of one or more symbols in a slot to allow transition between half-duplex transmission and half-duplex reception by the at least one of the first UE and the second UE.

Also or alternatively, implementations of such a UE may include one or more of the following features. The processor is configured to communicate with the second UE to determine the characteristic of the UE-to-UE location reference signal such that the characteristic of the UE-to-UE location reference signal includes a frequency range of the UE-to-UE location reference signal. The processor is configured to initiate the first UE-to-UE positioning function in response to receiving the first UE-to-UE positioning trigger from the second UE via the transceiver, and the processor is configured to: transmit the UE-to-UE location reference signal at a first transmission frequency in response to receiving the first UE-to-UE positioning trigger; and at least one of: transmit the UE-to-UE location reference signal at a second transmission frequency in response to an absence of receiving the first UE-to-UE positioning trigger, the second transmission frequency being lower than the first transmission frequency; or abstain from transmitting the UE-to-UE location reference signal at the second transmission frequency in response to the absence of receiving the first UE-to-UE positioning trigger. The processor is configured to send the second UE-to-UE positioning trigger for the second UE via the transceiver and via a network node. The processor is configured to send the second UE-to-UE positioning trigger for the second UE via the transceiver using a sidelink channel. The processor is configured to send the second UE-to-UE positioning trigger for the second UE, and the second UE-to-UE positioning trigger includes the UE-to-UE location reference signal. The processor is configured to send the second UE-to-UE positioning trigger for the second UE, and the second UE-to-UE positioning trigger includes at least one transmission parameter of the UE-to-UE location reference signal, the at least one transmission parameter including at least one of a timing, a frequency, a code sequence, or a periodicity. The processor is configured to communicate with the second UE to determine the characteristic of the UE-to-UE location reference signal, and the characteristic of the UE-to-UE location reference signal includes at least one of a comb number, a quantity of one or more consecutive symbols, a code sequence, or a scrambling sequence.

Also or alternatively, implementations of such a UE may include one or more of the following features. The processor is configured to exchange the UE-to-UE location reference signal with the second UE via the transceiver using a sidelink channel. The UE-to-UE location reference signal includes one of a sounding reference signal (SRS), a channel state information reference signal (CSI-RS), or a non-SRS, non-CSI-RS, staggered reference signal. The processor is configured to send a capabilities message via the transceiver indicating a capability of the first UE to exchange the UE-to-UE location reference signal as the SRS, the CSI-RS, or the non-SRS, non-CSI-RS, staggered reference signal. The processor and the transceiver are configured to send the UE-to-UE location reference signal with half-pi binary phase shift keying modulation.

Another example first UE includes: at least one of: initiating means, the initiating means for initiating a first UE-to-UE positioning function in response to receiving a first UE-to-UE positioning trigger from a second UE; or sending means, the sending means for sending a second UE-to-UE positioning trigger for the second UE to cause the second UE to initiate a second UE-to-UE positioning function; or determining means, the determining means for communicating with the second UE to determine a characteristic of a UE-to-UE location reference signal to he exchanged between the first UE and the second UE; and means for exchanging the UE-to-UE location reference signal with the second UE.

Implementations of such a UE may include one or more of the following features. The first UE includes the determining means and the determining means include means for determining the characteristic of the UE-to-UE location reference signal such that the characteristic of the UE-to-UE location reference signal includes a timing parameter of the UE-to-UE location reference signal to accommodate half-duplex communication by at least one of the first UE or the second UE. The first UE includes the determining means and the determining means include means for determining the characteristic of the UE-to-UE location reference signal such that the UE-to-UE location reference signal occupies the same one or more symbols in each of a plurality of consecutive slots. The timing parameter includes a muting pattern for the UE-to-UE location reference signal. The timing parameter is at least one quantity of one or more symbols in a slot to allow transition between half-duplex transmission and half-duplex reception by the at least one of the first UE and the second UE.

Also or alternatively, implementations of such a UE may include one or more of the following features. The first UE includes the determining means and the determining means include means for determining the characteristic of the UE-to-UE location reference signal such that the characteristic of the UE-to-UE location reference signal includes a frequency range of the UE-to-UE location reference signal. The first UE includes the initiating means, and the first UE further includes: first transmitting means for transmitting the UE-to-UE location reference signal at a first transmission frequency in response to receiving the first UE-to-UE positioning trigger; and at least one of: second transmitting means for transmitting the UE-to-UE location reference signal at a second transmission frequency in response to an absence of receiving the first UE-to-UE positioning trigger, the second transmission frequency being lower than the first transmission frequency; or means for abstaining from transmitting the UE-to-UE location reference signal at the second transmission frequency in response to the absence of receiving the first UE-to-UE positioning trigger. The first UE includes the sending means and the sending means include means for sending the second UE-to-UE positioning trigger for the second UE using a sidelink channel. The first UE includes the sending means, and the second UE-to-UE positioning trigger includes the UE-to-UE location reference signal. The first UE includes the sending means, and the second UE-to-UE positioning trigger includes at least one transmission parameter of the UE-to-UE location reference signal, the at least one transmission parameter including at least one of a timing, a frequency, a code sequence, or a periodicity. The first UE includes the determining means, and the characteristic of the UE-to-UE location reference signal includes at least one of a comb number, a quantity of one or more consecutive symbols, a code sequence, or a scrambling sequence.

Also or alternatively, implementations of such a UE may include one or more of the following features. The means for exchanging the UE-to-UE location reference signal with the second UE include means for exchanging the UE-to-UE location reference signal with the second UE using a sidelink channel. The UE-to-UE location reference signal includes one of a sounding reference signal (SRS), a channel state information reference signal (CSI-RS), or a non-SRS, non-CSI-RS, staggered reference signal. The first UE includes means for sending a capabilities message indicating a capability of the first UE to exchange the UE-to-UE location reference signal as the SRS, the CSI-RS, or the non-SRS, non-CSI-RS, staggered reference signal. The means for exchanging the UE-to-UE location reference signal with the second UE include means for exchanging the UE-to-UE location reference signal with the second UE with half-pi binary phase shift keying modulation.

An example method of location reference signal exchange includes: at least one of: initiating a first UE-to-UE positioning function at a first UE in response to receiving a first UE-to-UE positioning trigger at the first UE from a second UE; or sending a second UE-to-UE positioning trigger from the first UE for the second UE to cause the second UE to initiate a second UE-to-UE positioning function; or determining, based on communicating with the second UE, a characteristic of a UE-to-UE location reference signal to be exchanged between the first UE and the second UE; and exchanging the UE-to-UE location reference signal with the second UE.

Implementations of such a method may include one or more of the following features. The method includes determining the characteristic of the UE-to-UE location reference signal such that the characteristic of the UE-to-UE location reference signal includes a timing parameter of the UE-to-UE location reference signal to accommodate half-duplex communication by at least one of the first UE or the second UE. The method includes determining the characteristic of the UE-to-UE location reference signal such that the UE-to-UE location reference signal occupies the same one or more symbols in each of a plurality of consecutive slots. The timing parameter includes a muting pattern for the UE-to-UE location reference signal. The timing parameter is at least one quantity of one or more symbols in a slot to allow transition between half-duplex transmission and half-duplex reception by the at least one of the first UE and the second UE.

Also or alternatively, implementations of such a method may include one or more of the following features. The method includes determining the characteristic of the UE-to- UE location reference signal such that the characteristic of the UE-to-UE location reference signal includes a frequency range of the UE-to-UE location reference signal. The method includes initiating the first UE-to-UE positioning function, and the method includes: transmitting the UE-to-UE location reference signal at a first transmission frequency in response to receiving the first UE-to-UE positioning trigger; and either: transmitting the UE-to-UE location reference signal at a second transmission frequency in response to an absence of receiving the first UE-to-UE positioning trigger, the second transmission frequency being lower than the first transmission frequency; or abstaining from transmitting the UE-to-UE location reference signal at the second transmission frequency in response to the absence of receiving the first UE-to-UE positioning trigger. The method includes sending the second UE-to-UE positioning trigger for the second UE via a network node. The method includes sending the second UE-to-UE positioning trigger for the second UE using a sidelink channel. The method includes sending the second UE-to-UE positioning trigger for the second UE, and the second UE-to-UE positioning trigger includes the UE-to-UE location reference signal. The method includes sending the second UE-to-UE positioning trigger for the second UE, and the second UE-to-UE positioning trigger includes at least one transmission parameter of the UE-to-UE location reference signal, the at least one transmission parameter including at least one of a timing, a frequency, a code sequence, or a periodicity. The method includes determining the characteristic of the UE-to-UE location reference signal such that the characteristic of the UE-to-UE location reference signal includes at least one of a comb number, a quantity of one or more consecutive symbols, a code sequence, or a scrambling sequence.

Also or alternatively, implementations of such a method may include one or more of the following features. Exchanging the UE-to-UE location reference signal with the second. UE includes exchanging the UE-to-UE location reference signal with the second UE using a sidelink channel. The UE-to-UE location reference signal includes one of a sounding reference signal (SRS), a channel state information reference signal (CSI-RS), or a non-SRS, non-CSI-RS, staggered reference signal. The method includes sending a capabilities message indicating a capability of the first UE to exchange the UE-to-UE location reference signal as the SRS, the CSI-RS, or the non-SRS, non-CSI-RS, staggered reference signal. Exchanging the UE-to-UE location reference signal with the second UE includes exchanging the UE-to-UE location reference signal with the second UE with half-pi binary phase shift keying modulation.

An example non-transitory, processor-readable storage medium includes processor-readable instructions configured to cause a processor of a first user equipment (UE), in order to exchange a location reference signal, to: at least one of: initiate a first UE-to-UE positioning function in response to receiving a first UE-to-UE positioning trigger from a second UE; or send a second UE-to-UE positioning trigger for the second UE to cause the second UE to initiate a second UE-to-UE positioning function; or determine, based on communicating with the second UE, a characteristic of a UE-to-UE location reference signal to be exchanged between the first UE and the second UE; and exchange the UE-to-UE location reference signal with the second UE.

Implementations of such a storage medium may include one or more of the following features. The instructions include instructions configured to cause the processor to determine the characteristic of the UE-to-UE location reference signal such that the characteristic of the UE-to-UE location reference signal includes a timing parameter of the UE-to-UE location reference signal to accommodate half-duplex communication by at least one of the first UE or the second UE. The instructions include instructions configured to cause the processor to determine the characteristic of the UE-to-UE location reference signal such that the UE-to-UE location reference signal occupies the same one or more symbols in each of a plurality of consecutive slots. The timing parameter includes a muting pattern for the UE-to-UE location reference signal. The timing parameter is at least one quantity of one or more symbols in a slot to allow transition between half-duplex transmission and half-duplex reception by the at least one of the first UE and the second UE.

Also or alternatively, implementations of such a storage medium may include one or more of the following features. The instructions include instructions configured to cause the processor to determine the characteristic of the UE-to-UE location reference signal such that the characteristic of the UE-to-UE location reference signal includes a frequency range of the UE-to-UE location reference signal. The instructions include instructions configured to cause the processor to initiate the first UE-to-UE positioning function, and the storage medium includes instructions configured to cause the processor to: transmit the UE-to-UE location reference signal at a first transmission frequency in response to receiving the first UE-to-UE positioning trigger; and transmit the UE-to-UE location reference signal at a second transmission frequency in response to an absence of receiving the first UE-to-UE positioning trigger, the second transmission frequency being lower than the first transmission frequency. The instructions include instructions configured to cause the processor to send the second UE-to-UE positioning trigger for the second UE using a sidelink channel. The instructions include instructions configured to cause the processor to send the second UE-to-UE positioning trigger including the UE-to-UE location reference signal. The instructions include instructions configured to cause the processor to send the second UE-to-UE positioning trigger including at least one transmission parameter of the UE-to-UE location reference signal, the at least one transmission parameter including at least one of a timing, a frequency, a code sequence, or a periodicity. The instructions include instructions configured to cause the processor to determine the characteristic of the UE-to-UE location reference signal to comprise at least one of a comb number, a quantity of one or more consecutive symbols, a code sequence, or a scrambling sequence.

Also or alternatively, implementations of such a storage medium may include one or more of the following features. The instructions configured to cause the processor to exchange the UE-to-UE location reference signal with the second UE include instructions configured to cause the processor to exchange the UE-to-UE location reference signal with the second UE using a sidelink channel. The UE-to-UE location reference signal includes one of a sounding reference signal (SRS), a channel state information reference signal (CSI-RS), or a non-SRS, non-CSI-RS, staggered reference signal. The storage medium includes instructions configured to cause the processor to send a capabilities message indicating a capability of the first UE to exchange the UE-to-UE location reference signal as the SRS, the CSI-RS, or the non-SRS, non-CSI-RS, staggered reference signal. The instructions configured to cause the processor to exchange the UE-to-UE location reference signal with the second UE include instructions configured to cause the processor to exchange the UE-to-UE location reference signal with half-pi binary phase shift keying modulation.

DETAILED DESCRIPTION

Figure 1:
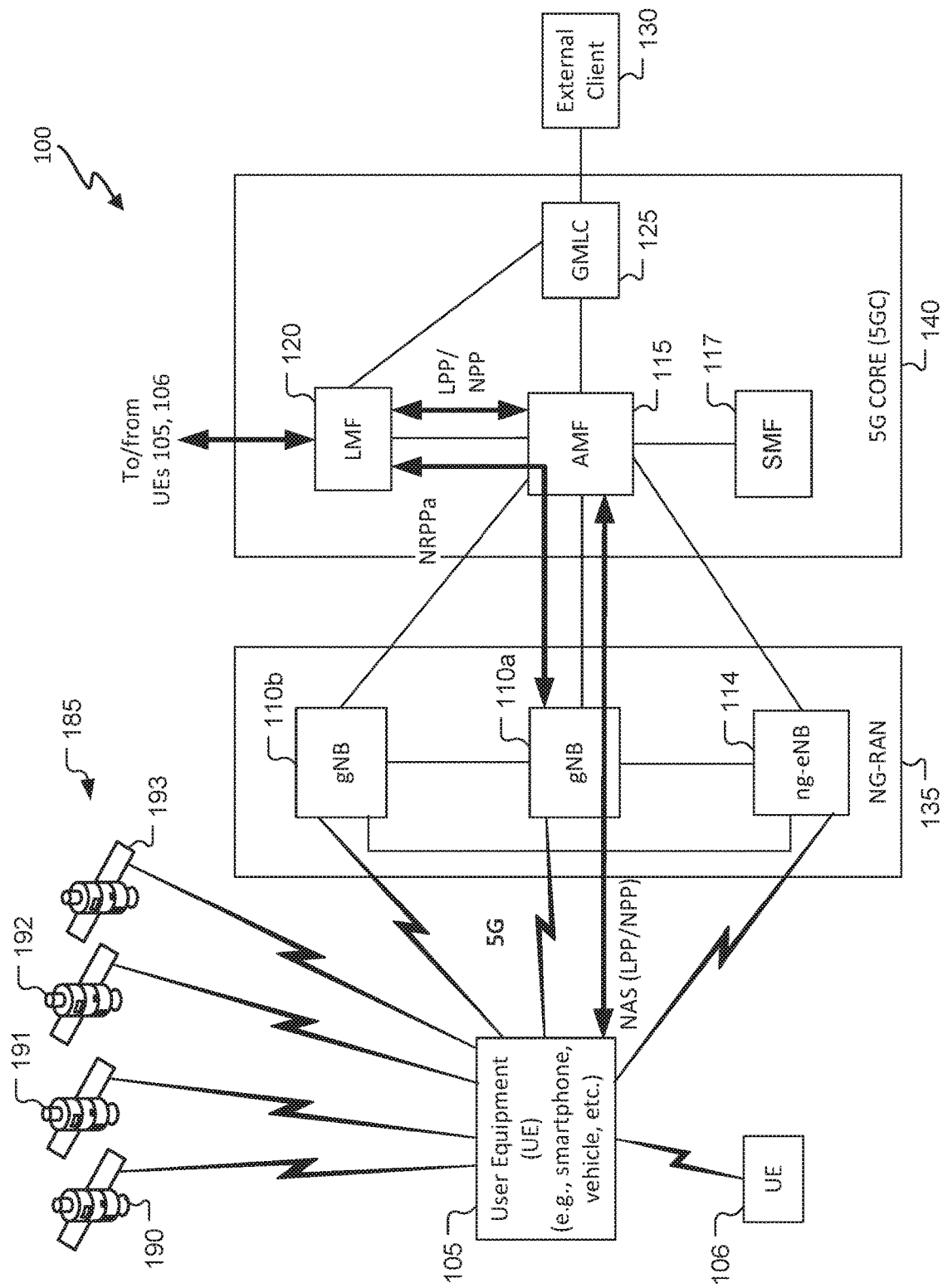
FIG. 1 is a simplified diagram of an example wireless communications system.

Techniques are discussed herein for UE-to-UE positioning. For example, a requesting UE (user equipment) may trigger a positioning function of a target UE remotely and on demand. The requesting UE may trigger the target UE via one or more network entities (e.g., base stations) or through UE-to-UE communication, e.g., directly through a sidelink channel. The requesting UE and the target UE may coordinate time and frequency parameters for exchange of a location reference signal between the requesting UE and the target UE for use in determining position of the target UE. Other examples, however, may be implemented.

Items and/or techniques described herein may provide one or more of the following capabilities, as well as other capabilities not mentioned. Power may be conserved for determination of a location of a UE. Battery life of a reduced-capability UE may be extended while providing for on-demand position determination. UE-to-UE positioning signaling may be coordinated to help avoid missed signal detection. A first UE can provide an indication to a second UE that the first UE can communicate with the second UE and that the first UE can transmit a location reference signal (LRS), on a sidelink channel, and/or that the first UE can be configured with an LRS resource and transmit the LRS on the configured resource, and/or that the first UE can configure another UE with the LRS resource. Other capabilities may be provided and not every implementation according to the disclosure must provide any, let alone all, of the capabilities discussed.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN. and through the core network the UEs can be connected with external networks such as the Internet and with other UEs. Of course, other mechanisms of connecting to the core network and or the Internet are also possible for the UEs, such as over wired access networks, WiFi networks (e.g., based on IEEE 802.11, etc. and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 fora Satellite Positioning System (SPS) (e.g., a Global Navigation Satellite System (GLASS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117. the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include interact of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may early pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the tern location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. I may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved. Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The IMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and provides QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The (AMC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP IS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI). Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*), and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
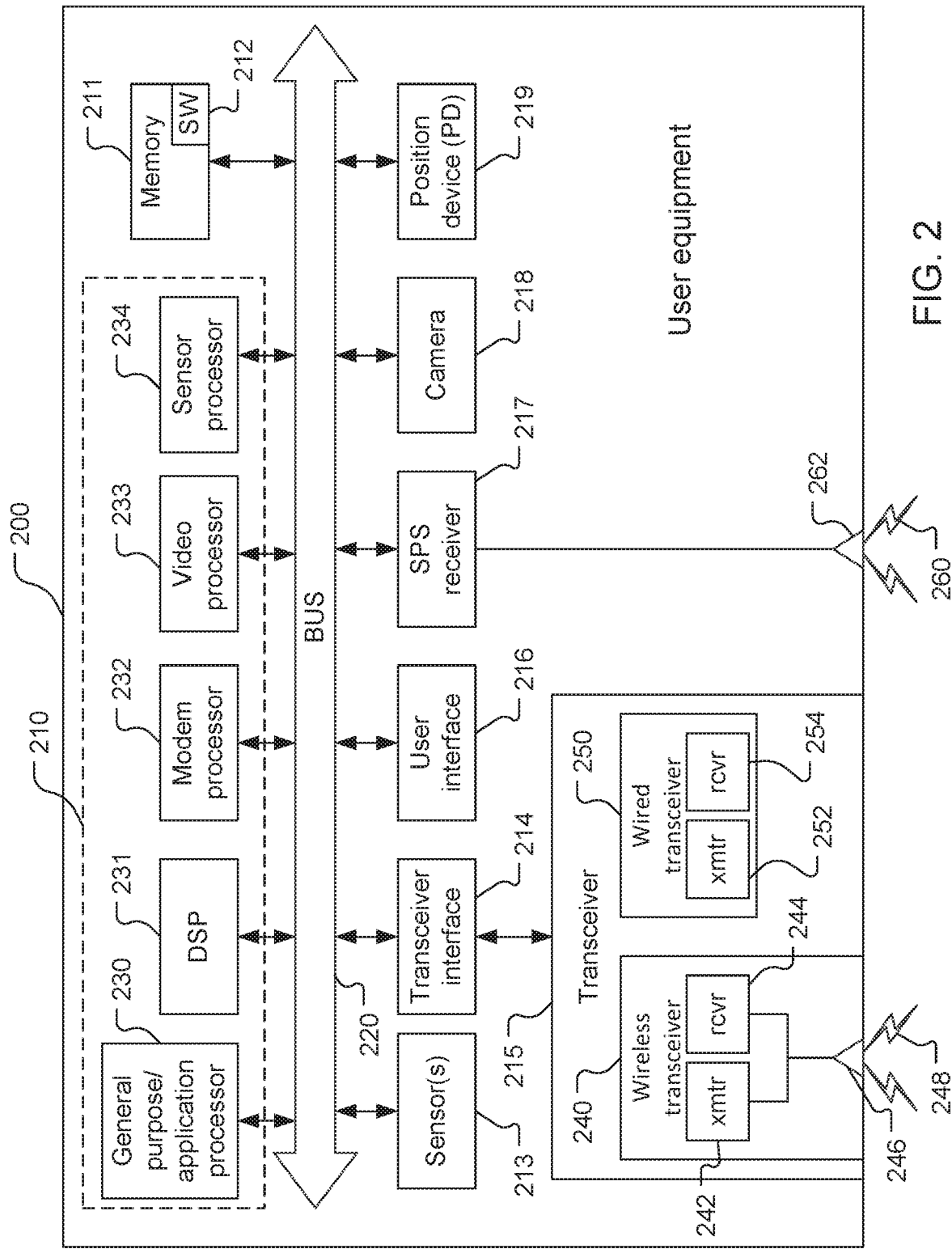
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to he upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors. etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s), the UE 200 may notify/ report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATS) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Tenn Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the network 135. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g, the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion.

Figure 3:
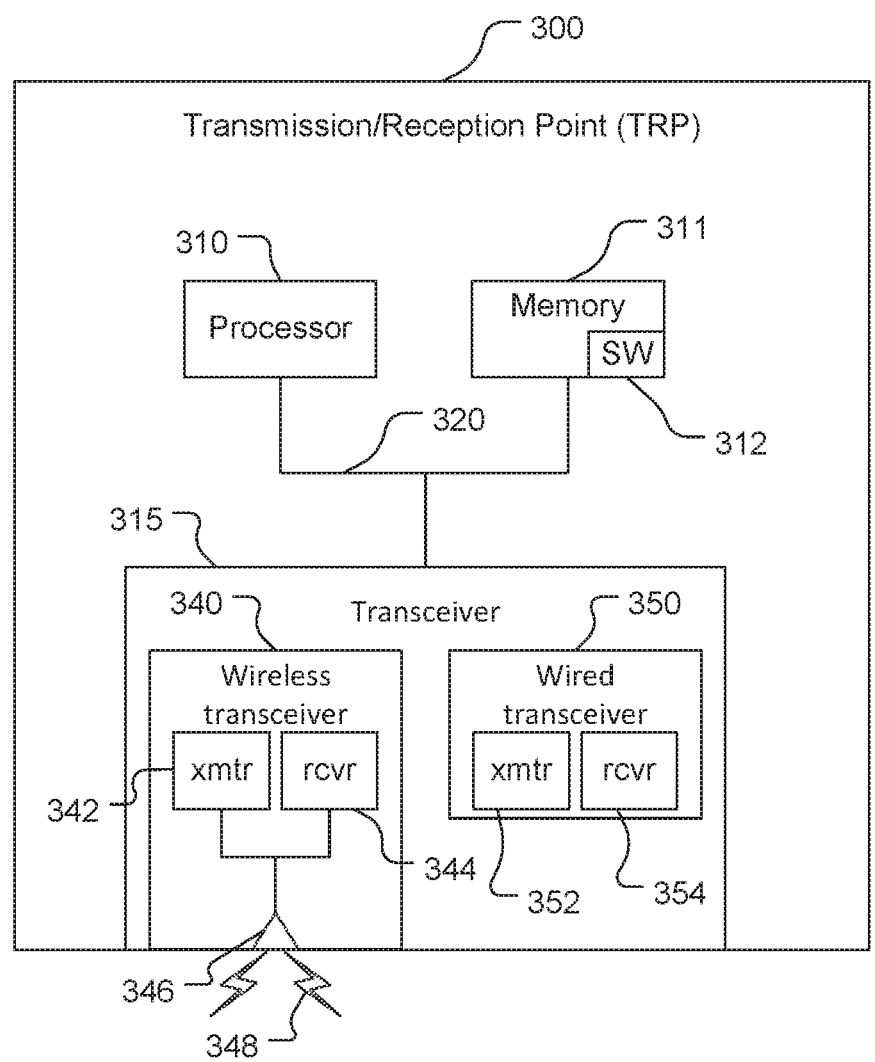
FIG. 3 is a block diagram of components of an example transmission/reception point shown in FIG. I.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/ application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, arid/or one or more other devices) according to a variety of radio access technologies (RATS) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 135 to send communications to, and receive communications from, the LMF 120, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
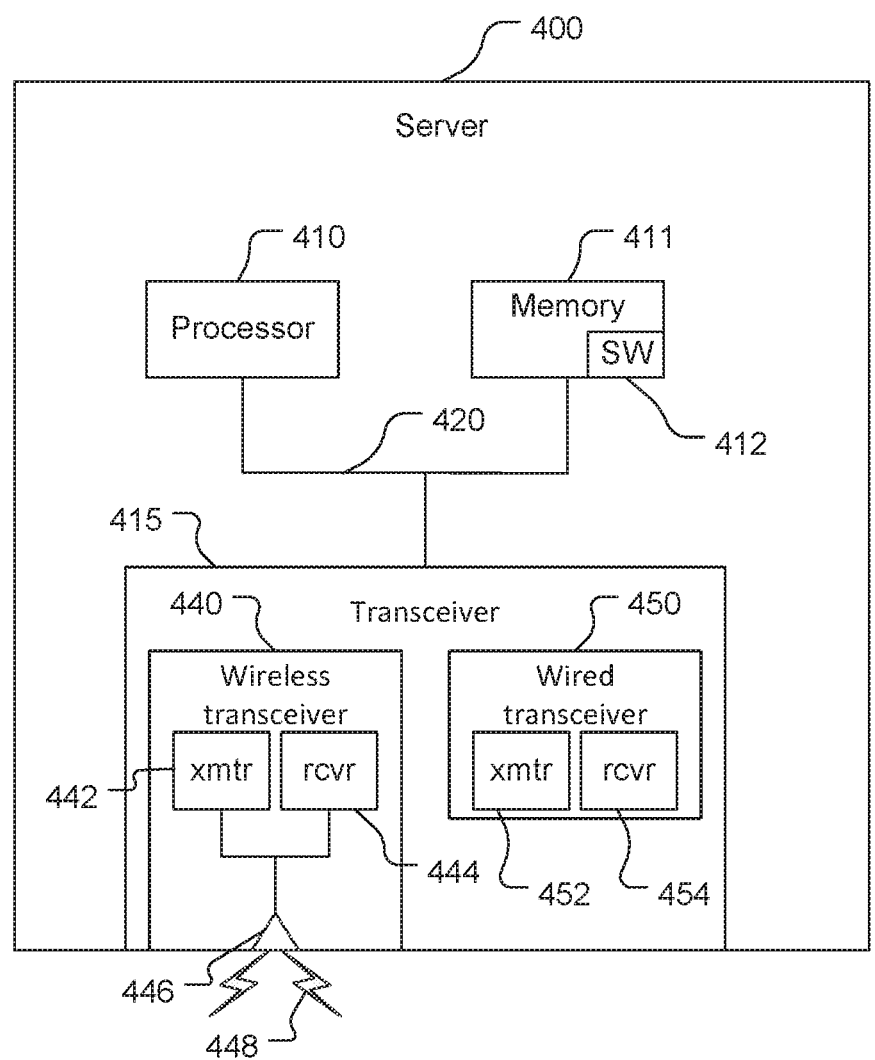
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing, a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to he generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS. a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric R I estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, UL-PRS) to the one or more base stations (e.g., when instructed by its serving base station) and may include the time difference $T_{Rx \rightarrow Tx}$ (i.e., UE $T_{Rx \rightarrow Tx}$ or $UE_{Rx \text{-} Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \rightarrow Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the WIT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight line direction g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics .g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal.

Positioning reference signals (PRS) include downlink PRS (DL PRS) and uplink PRS (UI. PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-Positioning-FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb-size.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that can span multiple Physical Resource Blocks (PRBs) within N (one or more) consecutive symbol(s) within a slot. A PRB is a collection of REs spanning a quantity of consecutive symbols in the time domain and a quantity of consecutive sub-carriers in the frequency domain. In an OFDM symbol, a PRS resource occupies consecutive PRBs. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set arc associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to he QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, hands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined. DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to he included with some specified or default level of confidence).

UE-to-UE Positioning

It is desirable for NR to be scalable and deployable in ever-more efficient and cost-effective ways. To do this, peak throughput, latency, and/or reliability requirements may be relaxed. Also or alternatively, efficiency (e.g., power consumption and system overhead) and cost improvements may be made. Reduced-capability UEs may be used to reduce power consumption and provide cost-effective UEs. Reduced-capability UEs have many uses, such as wearables, components of an industrial wireless sensor network (IWSN), surveillance cameras, low-cost smartphones, etc.

UEs may communicate (exchange signal(s)) with each other through UE-to-UE interaction, often through a sidelink (SL) channel. UEs may, however, be configured to send and receive uplink (UL) signals and to send and receive downlink (DL) signals, including DL-PRS and UL-SRS for positioning. Thus, UE-to-UE signaling may include signaling using an SL channel, a DL channel, and/or a UL channel. For transmission using an SL channel, a UE may operate in accordance with at least one of at least two modes. In a first mode, the UE receives a grant from a base station for resources on which to transmit SL signals, e.g., resources of the PSCCH and/or the PSSCH. In a second mode, the UE is configured with a resource pool that the UE may use, and the UE monitors the resource pool to determine which resources are not occupied and uses one or more of the unoccupied resources for transmission(s). The base station may configure the resource pool but not inform the UE of which resources to use, and the UE may perform blink detection in the resource pool. For reception using an SL channel, the UE may be configured with a resource pool, monitor that resource pool for incoming signals, and determine whether any particular incoming signal is intended for that UE. The UE may not be informed, e.g., by a base station, as to what resources to monitor for receiving signals even though the base station may configure the resource pool for reception to limit detection complexity.

Using UE-to-UE signal exchange for positioning may be desirable for multiple reasons. For example, SPS signals and/or base station signals may not be available and/or reliable (e.g., indoors, in urban canyons, etc.). As another example, UE-to-UE positioning may use less power than other forms of positioning (e.g., signal exchange with base stations). Reduced-capability UEs may introduce added challenges for UE-to-UE positioning as such UEs are more sensitive to power consumption than other UEs and reduced-capability UEs are often configured for half-duplex signaling instead of full-duplex signaling. With half-duplex signaling (either receiving or transmitting but not both concurrently), some inbound signals may be missed while the UE is transmitting. Coordination of time and frequency of signaling may be used to help avoid missing signals.

Figure 5:
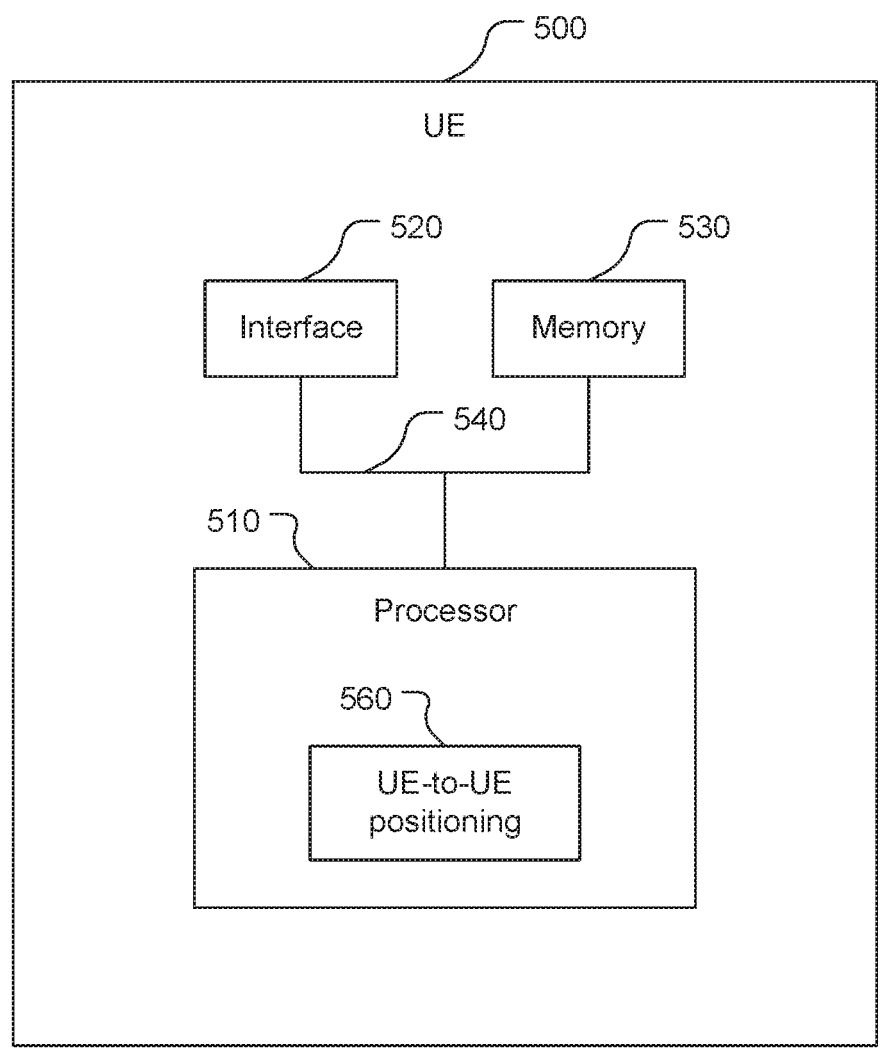
FIG. 5 is a simplified block diagram of an example of the user equipment shown in FIG. 2.

Referring to FIG. 5, with further reference to FIGS. 1-4, a UE 500, which is an example of the UE 200 shown in FIG. 2, includes a processor 510, an interface 520, and a memory 530 communicatively coupled to each other by a bus 540. The UE 500 may include some or all of the components shown in FIG. 5, and may include one or more other components such as any of those shown in FIG. 2. The processor 510 may include one or more components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the antenna 262. The memory 530 may be configured similarly to the memory 211, e.g., including software with processor-readable instructions configured to cause the processor 510 to perform. functions.

Implementations of the UE 500 may include premium UEs and/or reduced-capability UEs. A reduced-capability UE may have fewer capabilities than a premium UE. For example, a reduced-capability UE may not be able to communicate in full duplex, instead being configured to communicate, for example, in half duplex. As another example, a reduced-capability UE may have a lower data rate (e.g., 150 mbps) download than a premium UE. An example of reduced-capability UE is a category four (CAT 4) UE for LTE. Reduced-capability UEs may consume less power than a premium UE, e.g., being able to be in standby for eight hours or more with less battery capacity than a premium UE.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes UE-to-UE positioning unit 560. The UE-to-UE positioning unit 560 may be configured to perform one or more functions for facilitating UE-to-UE positioning, using UE-to-UE signal exchange for positioning (e.g., to measure one or more positioning signals and to determine position information).

The UE-to-UE positioning unit 560 may remotely trigger a positioning function (e.g., position signaling and measurement) in another UE or have a positioning function of the UE 500 remotely triggered by another UE. For example, the UE-to-UE positioning unit 560 may be configured to receive a UE-to-UE positioning trigger from another UE (e.g., directly or via one or more intermediate entities such as one or more TRPs 300). The UE-to-UE positioning trigger may be an instruction to perform a positioning function. The UE-to-UE positioning unit 560 may be configured to respond to receiving the positioning trigger by initiating a positioning function, e.g., initiating a positioning method to determine position information (e.g., positioning signal measurement(s), range(s), position estimate(s) for the UE 500, etc.). Also or alternatively, UE-to-UE positioning unit 560 may be configured to send a UE-to-UE positioning trigger to another UE (e.g., via one or more network entities and/or directly (e.g., using a sidelink channel, an uplink channel, or a downlink channel)) to initiate a positioning function (e.g., a positioning method) at the other UE. The remote triggering may trigger sending of one or more location reference signals (LRS). The LRS is one or more positioning reference signals sent between UEs. Example formats and/or content of the LRS are discussed further herein. The term LRS may refer to one or more location reference signals.

Absent remote triggering of the LRS, UE-to-UE positioning at a UE may not be activated or may have a low activation periodicity. For example, if the UE 500 is not remotely triggered to send LRS, then UE-to-UE positioning of the UE 500 may not be active, e.g., the UE 500 may not send LRS from the UE 500 to another UE. As another example, if the UE 500 is not remotely triggered to send LRS, then the UE 500 may send LRS to another UE with a lower periodicity than if the UE 500 has been remotely triggered to send LRS (e.g., has been triggered to perform a UE-to-UE positioning function). For example, in response to being remotely triggered, the UE 500 may send LRS every 5 ms or every 10 ms, and may send the LRS less often if not remotely triggered. For example, the periodicity of the LRS absent remote triggering of the LRS may be every 20 ms, 40 ms, 160 ms, 2 minutes, 10 minutes, or other time. For low periodicities (e.g., periods longer than 2 minutes between LRS transmissions), the periodicity may be configured through application-layer signaling instead of RRC (Radio Resource Control) signaling because RRC signaling specifies periodicity in terms of numbers of slots and thus RRC signaling would use a large number of bits to specify a low periodicity.

Figure 6:
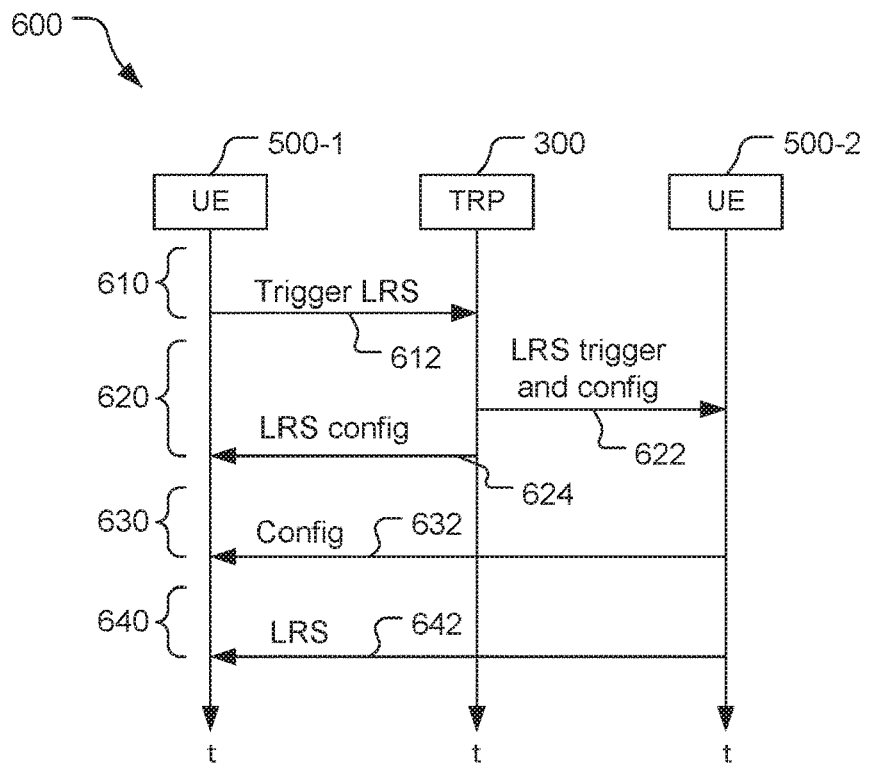
FIG. 6 is a signal flow diagram of location reference signal triggering and exchange.

Referring also to FIG. 6, a signal flow 600 includes the stages shown for a requesting UE 500-1 to trigger a positioning function of a target UE 500-2 remotely via one or more network entities. At stage 610, the requesting UE 500-1 sends a trigger LRS message 612 to the TRP 300. The trigger LRS message 612 is a positioning request for the target UE 500-2 to perform a positioning function. At stage 620, the TRP 300 responds to receiving the trigger LRS message 612 by sending an LRS trigger and configuration message 622 to the target UE 500-2. The LRS trigger and configuration message 622 triggers a UE-to-UE positioning function at the target UE 500-2. The LRS trigger and configuration message 622 also configures the target UE 500-2 with an LRS resource (e.g., code sequence, resource time and frequency, LRS periodicity, resource pattern). The TRP 300 also sends an LRS configuration message 624 to the requesting UE 500-1 indicating the configuration of the LRS resource contained in the LRS trigger and configuration message 622. At stage 630, the target UE 500-2 sends a response configuration message 632 either confirming the configuration from the message 622 or requesting a different configuration. The flow 600 may return to stage 610 and the flow 600 repeated until an LRS configuration is agreed to by the requesting UE 500-1 and the target UE 500-2, after which the flow 600 proceeds to stage 640. At stage 640, the target UE 500-2 (repeatedly) sends, e.g., in a sidelink channel, an LRS message 642 directly to the requesting UE 500-1. The LRS message 642 contains the LRS as configured by the message 622 and/or indicated by the message 632.

Figure 7:
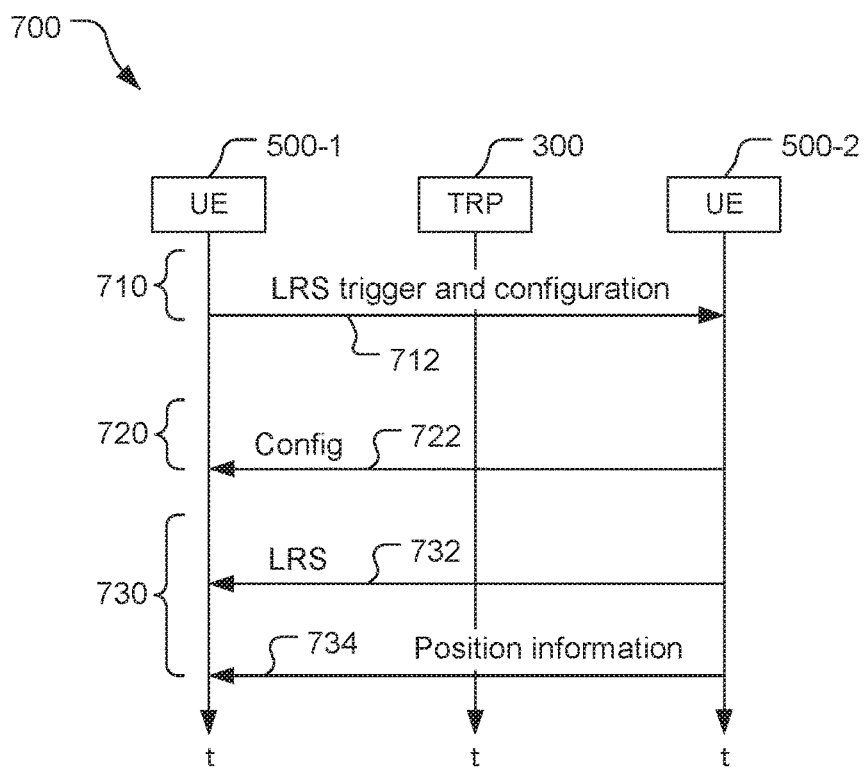
FIG. 7 is another signal flow diagram of location reference signal triggering and exchange.

Referring also to FIG. 7, a signal flow 700 includes the stages shown for the requesting UE 500-1 to trigger a positioning function of the target UE 500-2 remotely directly from the requesting UE 500-1 to the target UE 500-2. At stage 710, the requesting UE 500-1 sends an LRS trigger and configuration message 712 to the target UE 500-2 directly, e.g., in a sidelink channel, bypassing the TRP 300 (or other network entity). The LRS trigger and configuration message 712 is a request for the target UE 500-2 to perform a positioning function and triggers a UE-to-UE positioning function at the target UE 500-2. The LRS trigger and configuration message 712 may be in a predefined resource (e.g., BWP, code sequence, time and frequency of resource(s) (e.g., resource blocks (RBs)), resource pattern). For example, the predefined resource may be a RACH (Random Access CHannel) occasion. A BWP (BandWidth Part) comprises contiguous common resource blocks, the common resource blocks occupy a channel bandwidth, and the contiguous common resource blocks of the BWP may occupy some or all of the channel bandwidth. The request may be for LRS generally, without specifying an LRS configuration. Alternatively, the request may also include LRS configuration information to configure the target UE 500-2 with an LRS resource (e.g., code sequence, resource time and frequency, LRS periodicity, resource pattern) to be used by the target UE 500-2 to transmit LRS. The LRS trigger and configuration message 712 may be (or include) one or more LRS that the target UE 500-2 may use to determine position information. At stage 720, the target UE 500-2 may send a configuration message 722 in response to the message 712, either confirming the configuration in the message 712 or requesting a different configuration. The flow 700 may return to stage 710 and repeat until an LRS configuration is agreed to by the requesting UE 500-1 and the target UE 500-2, after which the flow 700 proceeds to stage 730. At stage 730, the target UE 500-2 may (repeatedly) send, e.g., in a sidelink channel, an LRS message 732 directly to the requesting UE 500-1. The LRS message 732 contains the LRS as configured by the message 712. Also or alternatively, if the LRS trigger and configuration message 712 contained LRS, then the UE 500-2 may send position information, in a position information message 734, to the requesting UE 500-1 that the target UE 500-2 determined based on (e.g., by measuring) the LRS contained in the LRS trigger and configuration message 712.

The LRS may be configured in a variety of ways. For example, the LRS may be configured similarly to SRS for positioning, or PRS, or CSI-RS (Channel State Information-Reference Signal), or with a new configuration, e.g., with a staggered structure (i.e., with resource elements in different symbols being offset with respect to each other). In the frequency domain, the LRS may have any of various comb numbers (e.g., 2, 4. 6, 8, etc.). In the time domain, the LRS may occupy one symbol or various quantities of consecutive symbols (e.g., 2, 4, etc.). In the code sequence domain, the raw LRS may be multiplied by any of a variety of sequences (e.g., Zadoff-Chu sequence, m-sequence, etc.) to produce the LRS. The LRS may be scrambled, e.g., with a group/UE-specific sequence (ID). The LRS may have a low PAPR (peak-to-average-power ratio), e.g., with an SRS format, or a CSI-RS format, or another format (e.g., a new format, e.g., with a staggered structure). The LRS may include half-pi ($\pi/2$) bpsk (binary phase shift keying), which may be beneficial for coverage and/or for the PAPR of the LRS (e.g., may provide a low PAPR for the LRS). The processor 510 and/or the interface 520 may be configured to provide half-pi bpsk to the LRS and/or to receive and decode LRS with half-pi bpsk. The UE 500 (e.g., the processor 510) may be configured to indicate, e.g., to other UEs and/or to network entities (e.g., the TRP 300 and/or the server 400) that the UE 500 has half-pi bpsk transmission/reception capability. For example, the UE 500 may include such information in a UE-capability message sent to one or more other UEs and/or to one or more network entities. As another example configuration of the LRS, the LRS may be configured not to occupy the CORESET/SSB (Control Resource Set/Synchronization Signal Block) symbols to help avoid affecting the CORESET and system information.

Referring again in particular to FIG. 5, the UE-to-UE positioning unit 560 may also or alternatively be configured to communicate with another UE (e.g., the UE-to-UE positioning unit 560 of another UE 500) to coordinate the exchange of one or more positioning reference signals between the UE 500 and another UE (which may be an example implementation of the UE 500). For example, the UE-to-UE positioning unit 560 may be configured to coordinate time and frequency of one or more location reference signals to he exchanged between the UEs.

The UE-to-UE positioning unit 560 may be configured to determine timing of one or more location reference signals. For example, the UE-to-UE positioning unit 560 may communicate with another UE to determine the timing. The timing may be determined in order to accommodate half-duplex communication by the UE 500 and/or the other UE. The timing may include one or more tinning parameters indicative of timing of the location reference signal(s) (LRS).

The timing determined by the UE-to-UE positioning unit 560 may be such that the UE 500 does not transmit and receive LRS in the same slot. This may help avoid missing LRS because a guard period (e.g., one or two symbols) may be needed by the UE 500 to change between LRS transmission and LRS reception or vice versa. The timing determined by the UE-to-UE positioning unit 560 may, for example, be a time repetition of the LRS such that the LRS may be repeated at the slot level, with the same symbol(s) of two or more consecutive slots being occupied by the LRS. In this case, the receiving UE may have multiple opportunities to receive the LRS and thus the accuracy of the time and frequency designation of the LRS may be more relaxed than if no repetition of the LRS occurs. As another example, the LRS may have no repetition (at least at the slot level, i.e., multiple slots with the same LRS in each slot), and the UE-to-UE positioning unit 560 may determine the timing in conjunction with another UE (e.g., the requesting UE 500-1) or a network entity (e.g., the TRP 300) with sufficient accuracy for the receiving UE to measure the LRS with only one occurrence of the LRS. The UE-to-UE positioning unit 560 may determine the timing by reading the configuration information in the LRS trigger and configuration message 622 or the LRS trigger and configuration message 712. As another example, the timing determined by the UE-to-UE positioning unit 560 may be a muting pattern for LRS resources indicating which LRS resources not to transmit. The muting pattern may provide intra-instance muting, to mute one or more selected resources within an LRS instance, or inter-instance muting to mute one or more selected LRS instances.

The timing determined by the UE-to-UE positioning unit 560 may be such that the UE 500 may transmit and receive LRS in the same slot. The timing would provide one or more symbols (gap symbols) to help the UE 500 to transition between LRS reception and LRS transmission without missing (not receiving) the LRS. The gap symbol(s) may allow for an automatic gain control (AGC) and a guard period.

The UE-to-UE positioning unit 560 may also or alternatively be configured to determine frequency of one or more location reference signals. For example, the UE-to-UE positioning unit 560 may coordinate with another UE 500 such that a BWP for the LRS of the UE transmitting the LRS is different from, but overlaps with, a BWP for the LRS of the UE receiving the LRS. The BWP of the receiving UE and the BWP of the transmitting UE may have a minimum overlap amount to help ensure reception and measurement of the LRS, e.g., with a desired performance quality. The LRS may be configured only at the overlapping frequencies of the BWPs. As another example, the UE-to-UE positioning unit 560 may coordinate with another UE 500 such that a BWP for the LRS of the UE transmitting the LRS is the same as the BWP for LRS of the receiving UE. The LRS may be configured to occupy the entire BWP (i.e., the entire frequency span of the BWP) or less than all of the BWP.

Figure 8:
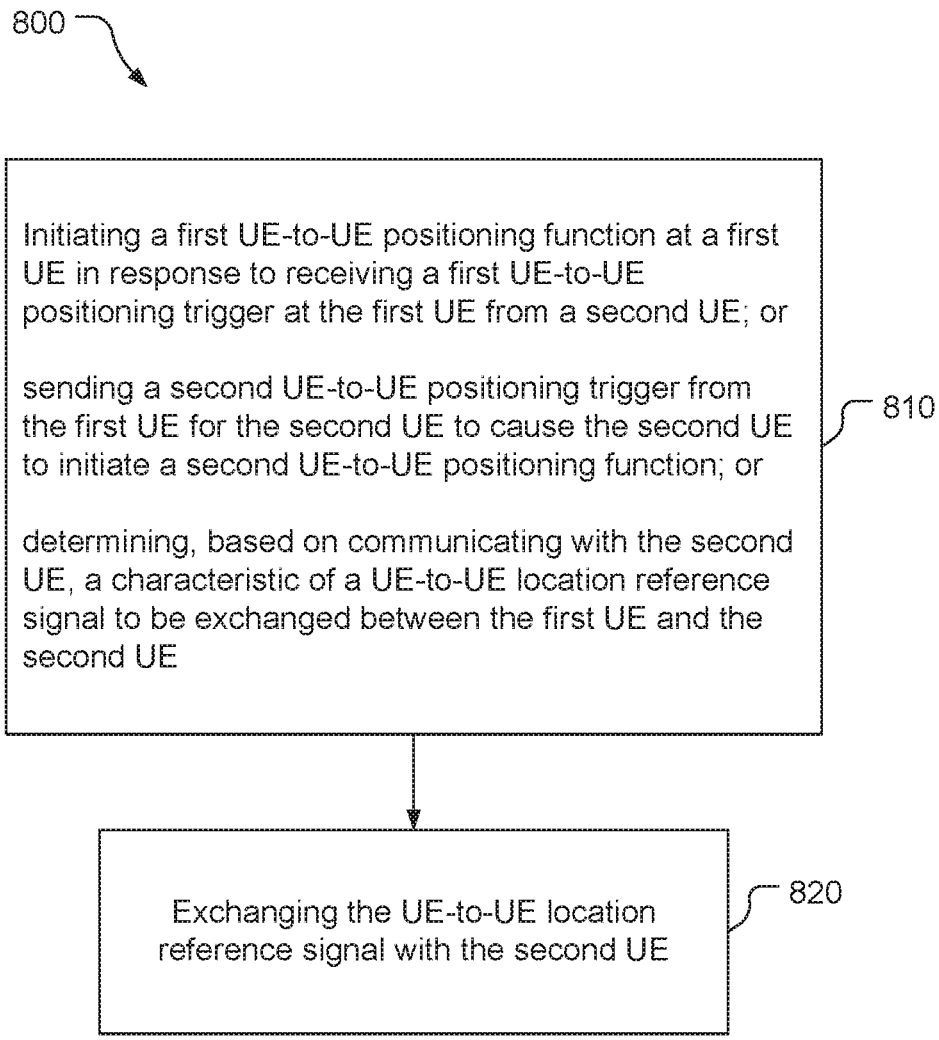
FIG. 8 is a block flow diagram of a method of location reference signal exchange.

Referring to FIG. 8, with further reference to FIGS. 1-7, a method 800 of location reference signal exchange includes the stages shown. The method 800 is, however, an example only and not limiting. The method 800 may be altered, e.g., by having stages added, removed, rearranged, combined, performed concurrently, and/or having single stages split into multiple stages.

At stage 810, the method 800 includes at least one of initiating a first UE-to-UE positioning function at a first UE in response to receiving a first UE-to-UE positioning trigger at the first UE from a second UE; or sending a second UE-to-UE positioning trigger from the first UE to the second UE to cause the second UE to initiate a second UE-to-UE positioning function; or determining, based on communicating with the second UE, a characteristic of a UE-to-UE location reference signal to be exchanged between the first UE and the second UE. For example, the target UE 500-2 may initiate a positioning method in response to receiving the LRS trigger and configuration message 622 (e.g., on a downlink channel on the Uu interface) or the LRS trigger and configuration message 712 (e.g., on a sidelink channel). The LRS trigger may be received indirectly (e.g., in the message 622 with the trigger being from the requesting UE 500-1, contained in the trigger LRS message 612, and causing the TRP 300 to send the message 622) or directly (e.g., in the message 712). As another example, the target UE 500-2 may initiate a positioning producing and sending the configuration message 632 or the configuration message 722 to attempt to agree to a configuration for LRS to be sent by the UE 500-2. The processor 510, possibly in combination with the memory 530 and/or possibly in combination with the interface 520 (e.g., the wireless receiver 244 and the antenna 246) may comprise means for initiating a first UE-to-UE positioning function.

As an example of sending a second UE-to-UE positioning trigger, the requesting UE 500-1 may send the trigger LRS message 612 (e.g., on an uplink channel over the Uu interface) or the LRS trigger and configuration message 712 (e.g., on a sidelink channel). The trigger LRS message 612 contains an LRS trigger and causes the TRP 300 to send the LRS trigger and configuration message 622 to the target UE 500-2, with the message 622 including the LRS trigger from the requesting UE 500-1. The processor 510, possibly in combination with the memory 530 and/or possibly in combination with the interface 520 (e.g., the wireless transmitter 242 and the antenna 246) may comprise means for sending a second UE-to-UE positioning trigger.

Determining a characteristic of the UE-to-UE location reference signal may be achieved in a variety of manners. For example, the target UE 500-2 may use the LRS trigger and configuration message 622, and possibly the configuration message 632, or possibly two or more of the messages 622 and one or more of the messages 632, to determine a characteristic (e.g., timing, etc.) of the LRS message 642. As another example, the target UE 500-2 may use the LRS trigger and configuration message 712, and possibly the configuration message 722, or possibly two or more of the messages 712 and one or more of the messages 722, to determine a characteristic (e.g., timing, etc.) of the LRS message 732. As another example, requesting UE 500-1 may use the trigger LRS message 612, and possibly the LRS configuration message 624 and/or the configuration message 632, or possibly two or more of the messages 612 and one or more of the messages 624 and/or one or more of the messages 632, to determine a. characteristic (e.g., timing, etc.) of the LRS message 642. As another example, the requesting UE 500-1 may use the LRS trigger and configuration message 712, and possibly the configuration message 722, or possibly two or more of the messages 712 and one or more of the messages 722, to determine a characteristic (e.g., timing, etc.) of the LRS message 732. The processor 510, possibly in combination with the memory 530, and the interface 520 (e.g., the antenna 246 and the wireless receiver 244 and/or the wireless transmitter 242) may comprise means for determining the characteristic of the UE-to-UE location reference signal.

At stage 820, the method 800 includes exchanging the UE-to-UE location reference signal with the second UE. For example, the target UE 500-2 sends the LRS message 642 or the LRS message 732 to the requesting UE 500-1, e.g., in a sidelink channel. As another example, the requesting UE 500-1 sends an LRS in the trigger LRS message 612 or in the LRS trigger and configuration message 712. The processor 510, possibly in combination with the memory 530, and the interface 520 (e.g., the antenna 246 and the wireless transmitter 242) may comprise means for exchanging the UE-to-UE location reference signal.

Implementations of the method 800 may include one or more of the following features. For example, the method 800 may comprise determining a timing parameter of the UE-to-UE location reference signal to accommodate half-duplex communication by at least one of the first UE or the second UE. For example, the requesting UE 500-1 may determine timing of LRS to be sent by the requesting UE 500-1 to help a half-duplex target UE to measure the LRS from the requesting UE 500-1. As another example, the target UE 500-2 may determine timing of the LRS to be sent by the target UE 500-2 to allow for reception and measurement of LRS by the target UE 500-2 in addition to transmission of the LRS. Whichever UE determines timing of the LRS informs the other UE of the LRS timing. The UE-to-UE characteristic may be determined such that the UE-to-UE LRS occupies the same symbol or the same symbols in each of multiple consecutive slots. The timing parameter may be a muting pattern for the LRS. As another example, the timing parameter may be one or more amounts of one or more symbols each corresponding to a slot to allow for transition between half-duplex transmission and half-duplex reception by a UE. The symbol(s) may be one or more gaps in the LRS.

Also or alternatively, implementations of the method 800 may include one or more of the following features. For example, the characteristic of the UE-to-UE LRS may be a frequency range of the UE-to-UE LRS. The frequency range may be determined such that the transmit and reception BWPs overlap at least for the LRS. As another example, the method 800 may include initiating the first UE-to-UE positioning function, and the method 800 may include: transmitting the UE-to-UE LRS at a first transmission frequency in response to receiving the first UE-to-UE positioning trigger; and either transmitting the LRS at a second frequency in the absence of receiving the first UE-to-UE positioning trigger or abstaining from transmitting the LRS in the absence of receiving the first UE-to-UE positioning trigger. For example, the target UE 500-2 may transmit the LRS message 642 or the LRS message 732 at a relatively high frequency (e.g, every 5 ms) in response to receiving the positioning trigger in the message 622 or the message 712, and, absent receiving the positioning trigger, either not transmitting the LRS or transmitting the LRS at a lower frequency (e.g., every 5 minutes or longer). The UE 500 may be configured to respond to the absence of receiving the positioning trigger by either not transmitting the LRS or transmitting the LRS with a relatively low frequency. The UE 500 may be configured to select whether to transmit the LRS or abstain from transmitting the LRS based on one or more factors, e.g., a time since a last LRS transmission, battery level of the UE 500 (e.g., abstaining from transmitting LRS if the battery level is below a threshold level, e.g., 20% of maximum capacity), etc. The processor 510, possibly in combination with the memory 530, and the interface 520 (e.g., the antenna 246 and the wireless transmitter 242) may comprise means for transmitting the UE-to-UE location reference signal.

Also or alternatively, implementations of the method 800 mas include one or more of the following features. For example, the method 800 may include sending the second UE-to-UE positioning trigger for the second UE via a network node. The requesting UE 500-1 may, for example, send the trigger LRS message 612 to the TRP 300 for the TRP 300 to send the LRS trigger and configuration message 622 to the target UE 500-2. As another example, the method 800 may include sending the second UE-to-UE positioning trigger for the second UE using a sidelink channel. The requesting UE 500-I may, for example, send the LRS trigger and configuration message 712 to the target UE 500-2 on a sidelink channel. As another example, the method 800 may include sending the second UE-to-UE positioning trigger for the second UE, and the second UE-to-UE positioning trigger may include the UE-to-UE location reference signal. For example, the requesting UE 500-1 may send LRS in the LRS trigger and configuration message 712. As another example, the method 800 may include sending the second. UE-to-UE positioning trigger for the second UE, and the second UE-to-UE positioning trigger may include at least one transmission parameter of the UE-to-UE location reference signal, the at least one transmission parameter comprising at least one of a timing, a frequency, a code sequence, or a periodicity. For example, the requesting UE 500-1 may include one or more transmission parameters for the LRS in the trigger LRS message 612 or the LRS trigger and configuration message 712. As another example, the method 800 may include determining; the characteristic of the UE-to-UE location reference signal such that the characteristic of the UE-to-UE location reference signal comprises at least one of a comb number, a quantity of one or more consecutive symbols, a code sequence, or a scrambling sequence. For example, the target UE 500-2 may use information from the LRS trigger and configuration message 622, 712 to determine one or more of such characteristics, or may request one or more values for one or more of such characteristics. As another example, the requesting UE 500-1 may determine one or more of such characteristics based on the configuration message 632, 722 received from the target UE 500-2.

Also or alternatively, implementations of the method 800 may include one or more of the following features. For example, exchanging the UE-to-UE location reference signal with the second UE may include exchanging the UE-to-UE location reference signal with the second UE using a sidelink channel. For example, the target UE 500-2 may send the LRS message 732 on a sidelink channel and/or the requesting UE 500-1 may send LRS in the LRS trigger and configuration message 712 on a sidelink channel. The UE-to-UE location reference signal may comprise one of a sounding reference signal (SRS), a channel state information reference signal (CSI-RS), or a non-SRS, non-CSI-RS, staggered reference signal. As another example, the method 800 may include sending a capabilities message indicating a capability of the first UE to exchange the UE-to-UE location reference signal as the SRS, the CSI-RS, or the non-SRS, non-CSI-RS, staggered reference signal. The requesting UE 500-1 and/or the target UE 500-2 may, for example, send a capabilities message, e.g., to the other UE and/or to one or more network entities (e.g., the TRP 300), indicating that the UE 500 can exchange (e.g., send and/or receive) LRS with a format of an SRS, a CSI-RS, or another, staggered, LRS format. The processor 510, possibly in combination with the memory 530, and the interface 520 (e.g., the antenna 246 and the wireless transmitter 242) may comprise means for sending a capabilities message. As another example, exchanging the UE-to-UE location reference signal with the second UE may include exchanging the UE-to-UE location reference signal with the second UE with half-pi binary phase shift keying modulation. The SRS, CSI-RS, or other LRS format may, for example, be half-pi BPSK modulated.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or: B (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not he able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, arid does not limit the scope, applicability, or configurations of the claims. Rather, the preceding description of the configurations provides a description for implementing described techniques. Various changes may be made in the function and arrangement of elements.

The terms "processor-readable medium," "machine-readable medium." and "computer-readable medium," as used herein, refer to any medium that participates in providing data that causes a machine to operate in a specific fashion. Using a computing platform, various processor-readable media might he involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A first user equipment (UE) comprising:
a transceiver;
a memory; and
a processor, communicatively coupled to the transceiver and the memory, configured to:
at least one of:
(1) initiate a first UE-to-UE positioning function in response to receiving a first UE-to-UE positioning trigger from a second UE via the transceiver;
transmit a first UE-to-UE location reference signal at a first transmission frequency in response to receiving the first UE-to-UE positioning trigger; and
at least one of:
transmit the first UE-to-UE location reference signal at a second transmission frequency in response to an absence of receiving the first UE-to-UE positioning trigger, the second transmission frequency being lower than the first transmission frequency; or
abstain from transmitting the first UE-to-UE location reference signal at the second transmission frequency in response to the absence of receiving the first UE-to-UE positioning trigger; or
(2) communicate with the second UE via the transceiver to determine a characteristic of a second UE-to-UE location reference signal to be exchanged transferred between the first UE and the second UE, wherein the characteristic of the second UE-to-UE location reference signal comprises a timing parameter of the second UE-to-UE location reference signal to accommodate half-duplex communication by at least one of the first UE or the second UE, and wherein the timing parameter includes at least one quantity of one or more symbols in a slot to allow transition between half-duplex transmission and half-duplex reception by the at least one of the first UE and the second UE; and
transfer the second UE-to-UE location reference signal between the first UE and the second UE via the transceiver.

2. The first UE of claim 1, wherein the processor is configured to communicate with the second UE to determine the characteristic of the second UE-to-UE location reference signal, wherein the second UE-to-UE location reference signal occupies the same one or more symbols in each of a plurality of consecutive slots.

3. The first UE of claim 1, wherein the processor is configured to communicate with the second UE to determine the characteristic of the second UE-to-UE location reference signal, and wherein the timing parameter comprises a muting pattern for the second UE-to-UE location reference signal.

4. The first UE of claim 1, wherein the processor is configured to communicate with the second UE to determine the characteristic of the second UE-to-UE location reference signal wherein the characteristic of the second UE-to-UE location reference signal comprises a frequency range of the second UE-to-UE location reference signal.

5. The first UE of claim 1, wherein the processor is configured to send a second UE-to-UE positioning trigger for the second UE via a network node to cause the second UE to initiate a second UE-to-UE positioning function.

6. The first UE of claim 1, wherein the processor is configured to send a second UE-to-UE positioning trigger for the second UE via the transceiver using a sidelink channel to cause the second UE to initiate a second UE-to-UE positioning function.

7. The first UE of claim 1, wherein the processor is configured to send a second UE-to-UE positioning trigger for the second UE via the transceiver to cause the second UE to initiate a second UE-to-UE positioning function, and wherein the second UE-to-UE positioning trigger includes the second UE-to-UE location reference signal.

8. The first UE of claim 1, wherein the processor is configured to send a second UE-to-UE positioning trigger for the second UE via the transceiver to cause the second UE to initiate a second UE-to-UE positioning function, and wherein the second UE-to-UE positioning trigger includes at least one transmission parameter of the second UE-to-UE location reference signal, the at least one transmission parameter comprising at least one of a timing, a frequency, a code sequence, or a periodicity.

9. The first UE of claim 1, wherein the processor is configured to communicate with the second UE to determine the characteristic of the second UE-to-UE location reference signal, and wherein the characteristic of the second UE-to-UE location reference signal comprises at least one of a comb number, a quantity of one or more consecutive symbols, a code sequence, or a scrambling sequence.

10. The first UE of claim 1, wherein the processor is configured to transfer the second UE-to-UE location reference signal with the second UE via the transceiver using a sidelink channel.

11. The first UE of claim 10, wherein the second UE-to-UE location reference signal comprises one of a sounding reference signal (SRS), a channel state information reference signal (CSI-RS), or a non-SRS, non-CSI-RS, staggered reference signal.

12. The first UE of claim 11, wherein the processor is configured to send a capabilities message via the transceiver indicating a capability of the first UE to transfer the second UE-to-UE location reference signal as the SRS, the CSI-RS, or the non-SRS, non-CSI-RS, staggered reference signal.

13. The first UE of claim 12, wherein the processor and the transceiver are configured to send the second UE-to-UE location reference signal with half-pi binary phase shift keying modulation.

14. A first user equipment (UE) comprising:
at least one of:
(1) initiating means, the initiating means for initiating a first UE-to-UE positioning function in response to receiving a first UE-to-UE positioning trigger from a second UE;
first transmitting means for transmitting the UE-to-UE location reference signal at a first transmission frequency in response to receiving the first UE-to-UE positioning trigger; and
at least one of:
second transmitting means for transmitting the UE-to-UE location reference signal at a second transmission frequency in response to an absence of receiving the first UE-to-UE positioning trigger, the second transmission frequency being lower than the first transmission frequency; or
means for abstaining from transmitting the UE-to-UE location reference signal at the second transmission frequency in response to the absence of receiving the first UE-to-UE positioning trigger; or
(2) determining means, the determining means for communicating with the second UE to determine a characteristic of a second UE-to-UE location reference signal to be transferred between the first UE and the second UE, wherein the characteristic of the second UE-to-UE location reference signal comprises a timing parameter of the second UE-to-UE location reference signal to accommodate half-duplex communication by at least one of the first UE or the second UE, and wherein the timing parameter includes at least one quantity of one or more symbols in a slot to allow transition between half-duplex transmission and half-duplex reception by the at least one of the first UE and the second UE; and means for transferring the second UE-to-UE location reference signal between the first UE and the second UE.

15. The first UE of claim 14, wherein the first UE comprises the determining means and the determining means include means for determining the characteristic of the second UE-to-UE location reference signal, wherein the second UE-to-UE location reference signal occupies the same one or more symbols in each of a plurality of consecutive slots.

16. The first UE of claim 14, wherein the first UE comprises the determining means, and wherein the timing parameter comprises a muting pattern for the second UE-to-UE location reference signal.

17. The first UE of claim 14, wherein the first UE comprises the determining means and the determining means include means for determining the characteristic of the second UE-to-UE location reference signal wherein the characteristic of the second UE-to-UE location reference signal comprises a frequency range of the second UE-to-UE location reference signal.

18. The first UE of claim 14, wherein the first UE comprises means for sending a second UE-to-UE positioning trigger for the second UE using a sidelink channel to cause the second UE to initiate a second UE-to-UE positioning function.

19. The first UE of claim 14, wherein the first UE comprises the sending means for sending a second UE-to-UE positioning trigger for the second UE to cause the second UE to initiate a second UE-to-UE positioning function, wherein the second UE-to-UE positioning trigger includes the second UE-to-UE location reference signal.

20. The first UE of claim 14, wherein the first UE comprises sending means for sending a second UE-to-UE positioning trigger for the second UE to cause the second UE to initiate a second UE-to-UE positioning function, wherein the second UE-to-UE positioning trigger includes at least one transmission parameter of the second UE-to-UE location reference signal, the at least one transmission parameter comprising at least one of a timing, a frequency, a code sequence, or a periodicity.

21. The first UE of claim 14, wherein the first UE comprises the determining means, and wherein the characteristic of the second UE-to-UE location reference signal comprises at least one of a comb number, a quantity of one or more consecutive symbols, a code sequence, or a scrambling sequence.

22. The first UE of claim 14, wherein the means for transferring the second UE-to-UE location reference signal with the second UE include means for transferring the second UE-to-UE location reference signal with the second UE using a sidelink channel.

23. The first UE of claim 22, wherein the second UE-to-UE location reference signal comprises one of a sounding reference signal (SRS), a channel state information reference signal (CSI-RS), or a non-SRS, non-CSI-RS, staggered reference signal.

24. The first UE of claim 23, further comprising means for sending a capabilities message indicating a capability of the first UE to transfer the second UE-to-UE location reference signal as the SRS, the CSI-RS, or the non-SRS, non-CSI-RS, staggered reference signal.

25. The first UE of claim 24, wherein the means for transferring the second UE-to-UE location reference signal with the second UE include means for transferring the second UE-to-UE location reference signal with the second UE with half-pi binary phase shift keying modulation.

26. A method of location reference signal transfer, the method comprising:
at least one of:
(1) initiating a first UE-to-UE positioning function at a first UE in response to receiving a first UE-to-UE positioning trigger at the first UE from a second UE;
transmitting the UE-to-UE location reference signal at a first transmission frequency in response to receiving the first UE-to-UE positioning trigger; and
either:
transmitting the UE-to-UE location reference signal at a second transmission frequency in response to an absence of receiving the first UE-to-UE positioning trigger, the second transmission frequency being lower than the first transmission frequency; or
abstaining from transmitting the UE-to-UE location reference signal at the second transmission frequency in response to the absence of receiving the first UE-to-UE positioning trigger; or
determining, based on communicating with the second UE, a characteristic of a second UE-to-UE location reference signal to be transferred between the first UE and the second UE, wherein the characteristic of the second UE-to-UE location reference signal comprises a timing parameter of the second UE-to-UE location reference signal to accommodate half-duplex communication by at least one of the first UE or the second UE, and wherein the timing parameter includes at least one quantity of one or more symbols in a slot to allow transition between half-duplex transmission and half-duplex reception by the at least one of the first UE and the second UE; and
transferring the second UE-to-UE location reference signal with between the first UE and the second UE.

27. The method of claim 26, wherein the method comprises determining the characteristic of the second UE-to-UE location reference signal, wherein the second UE-to-UE location reference signal occupies the same one or more symbols in each of a plurality of consecutive slots.

28. The method of claim 26, wherein the method comprises determining the characteristic of the second UE-to-UE location reference signal, and wherein the timing parameter comprises a muting pattern for the UE-to-UE location reference signal.

29. The method of claim 26, wherein the method comprises determining the characteristic of the second UE-to-UE location reference signal wherein the characteristic of the second UE-to-UE location reference signal comprises a frequency range of the second UE-to-UE location reference signal.

30. The method of claim 26, wherein the method comprises sending a second UE-to-UE positioning trigger for the second UE via a network node to cause the second UE to initiate a second UE-to-UE positioning function.

31. The method of claim 26, wherein the method comprises sending a second UE-to-UE positioning trigger for the second UE using a sidelink channel to cause the second UE to initiate a second UE-to-UE positioning function.

32. The method of claim 26, wherein the method comprises sending a second UE-to-UE positioning trigger for the second UE to cause the second UE to initiate a second UE-to-UE positioning function, and wherein the second UE-to-UE positioning trigger includes the second UE-to-UE location reference signal.

33. The method of claim 26, wherein the method comprises sending a second UE-to-UE positioning trigger for the second UE to cause the second UE to initiate a second UE-to-UE positioning function, and wherein the second UE-to-UE positioning trigger includes at least one transmission parameter of the second UE-to-UE location reference signal, the at least one transmission parameter comprising at least one of a timing, a frequency, a code sequence, or a periodicity.

34. The method of claim 26, wherein the method comprises determining the characteristic of the second UE-to-UE location reference signal wherein the characteristic of the second UE-to-UE location reference signal comprises at least one of a comb number, a quantity of one or more consecutive symbols, a code sequence, or a scrambling sequence.

35. The method of claim 26, wherein transferring the second UE-to-UE location reference signal with the second UE includes transferring the second UE-to-UE location reference signal with the second UE using a sidelink channel.

36. The method of claim 35, wherein the second UE-to-UE location reference signal comprises one of a sounding reference signal (SRS), a channel state information reference signal (CSI-RS), or a non-SRS, non-CSI-RS, staggered reference signal.

37. The method of claim 36, further comprising sending a capabilities message indicating a capability of the first UE to transfer the second UE-to-UE location reference signal as the SRS, the CSI-RS, or the non-SRS, non-CSI-RS, staggered reference signal.

38. The method of claim 37, wherein transferring the second UE-to-UE location reference signal with the second UE includes transferring the second UE-to-UE location reference signal with the second UE with half-pi binary phase shift keying modulation.

39. A non-transitory, processor-readable storage medium comprising processor-readable instructions configured to cause a processor of a first user equipment (UE), in order to transfer a location reference signal, to:
at least one of:
(1) initiate a first UE-to-UE positioning function in response to receiving a first UE-to-UE positioning trigger from a second UE; or
transmit the UE-to-UE location reference signal at a first transmission frequency in response to receiving the first UE-to-UE positioning trigger; and
transmit the UE-to-UE location reference signal at a second transmission frequency in response to an absence of receiving the first UE-to-UE positioning trigger, the second transmission frequency being lower than the first transmission frequency
(2) determine, based on communicating with the second UE, a characteristic of a second UE-to-UE location reference signal to be transferred between the first UE and the second UE, wherein the characteristic of the second UE-to-UE location reference signal comprises a timing parameter of the second UE-to-UE location reference signal to accommodate half-duplex communication by at least one of the first UE or the second UE, and wherein the timing parameter includes at least one quantity of one or more symbols in a slot to allow transition between half-duplex transmission and half-duplex reception by the at least one of the first UE and the second UE; and
transfer the second UE-to-UE location reference signal between the first UE and the second UE.

40. The storage medium of claim 39, wherein the instructions comprise instructions configured to cause the processor to determine the characteristic of the second UE-to-UE location reference signal, wherein the second UE-to-UE location reference signal occupies the same one or more symbols in each of a plurality of consecutive slots.

41. The storage medium of claim 39, wherein the instructions comprise instructions configured to cause the processor to determine the characteristic of the second UE-to-UE location reference signal, and wherein the timing parameter comprises a muting pattern for the UE-to-UE location reference signal.

42. The storage medium of claim 39, wherein the instructions comprise instructions configured to cause the processor to determine the characteristic of the second UE-to-UE location reference signal wherein the characteristic of the UE-to-UE location reference signal comprises a frequency range of the second UE-to-UE location reference signal.

43. The storage medium of claim 39, wherein the instructions comprise instructions configured to cause the processor to send a second UE-to-UE positioning trigger for the second UE using a sidelink channel to cause the second UE to initiate a second UE-to-UE positioning function.

44. The storage medium of claim 39, wherein the instructions comprise instructions configured to cause the processor to send a second UE-to-UE positioning trigger for the second UE to cause the second UE to initiate a second UE-to-UE positioning function, and wherein the second UE-to-UE positioning trigger includes the UE-to-UE location reference signal.

45. The storage medium of claim 39, wherein the instructions comprise instructions configured to cause the processor to send a second UE-to-UE positioning trigger for the second UE to cause the second UE to initiate a second UE-to-UE positioning function, and wherein the second UE-to-UE positioning trigger includes at least one transmission parameter of the second UE-to-UE location reference signal, the at least one transmission parameter comprising at least one of a timing, a frequency, a code sequence, or a periodicity.

46. The storage medium of claim 39, wherein the instructions comprise instructions configured to cause the processor to determine the characteristic of the second UE-to-UE location reference signal to comprise at least one of a comb number, a quantity of one or more consecutive symbols, a code sequence, or a scrambling sequence.

47. The storage medium of claim 39, wherein the instructions configured to cause the processor to exchange transfer the second UE-to-UE location reference signal with the second UE include instructions configured to cause the processor to transfer the second UE-to-UE location reference signal with the second UE using a sidelink channel.

48. The storage medium of claim 47, wherein the second UE-to-UE location reference signal comprises one of a sounding reference signal (SRS), a channel state information reference signal (CSI-RS), or a non-SRS, non-CSI-RS, staggered reference signal.

49. The storage medium of claim 48, further comprising instructions configured to cause the processor to send a capabilities message indicating a capability of the first UE to transfer the second UE-to-UE location reference signal as the SRS, the CSI-RS, or the non-SRS, non-CSI-RS, staggered reference signal.

50. The storage medium of claim 49 wherein the instructions configured to cause the processor to transfer the second UE-to-UE location reference signal with the second UE include instructions configured to cause the processor to transfer the second UE-to-UE location reference signal with half-pi binary phase shift keying modulation.

* * * * *